(12) United States Patent
Kanayama

(10) Patent No.: US 9,765,883 B2
(45) Date of Patent: Sep. 19, 2017

(54) CONTINUOUSLY VARIABLE TRANSMISSION AND CONTROL METHOD THEREFOR

(71) Applicant: JATCO LTD, Fuji-shi, Shizuoka (JP)

(72) Inventor: Yoshiteru Kanayama, Yokohama (JP)

(73) Assignee: JATCO Ltd, Fuji-Shi (JP)

( * ) Notice: Subject to any disclaimer, the term of this patent is extended or adjusted under 35 U.S.C. 154(b) by 168 days.

(21) Appl. No.: 14/778,392

(22) PCT Filed: Mar. 20, 2014

(86) PCT No.: PCT/JP2014/057881
§ 371 (c)(1),
(2) Date: Sep. 18, 2015

(87) PCT Pub. No.: WO2014/157002
PCT Pub. Date: Oct. 2, 2014

(65) Prior Publication Data
US 2016/0281847 A1    Sep. 29, 2016

(30) Foreign Application Priority Data

Mar. 25, 2013  (JP) ................................. 2013-061776

(51) Int. Cl.
*F16H 61/662* (2006.01)
*F16H 55/17* (2006.01)
(Continued)

(52) U.S. Cl.
CPC ......... *F16H 61/66272* (2013.01); *F16H 9/18* (2013.01); *F16H 9/24* (2013.01); *F16H 55/171* (2013.01); *F16H 55/56* (2013.01); *F16H 61/04* (2013.01); *F16H 61/12* (2013.01); *F16H 61/662* (2013.01); *F16H 63/065* (2013.01)

(58) Field of Classification Search
CPC .. F16H 61/66272; F16H 61/12; F16H 61/662; F16H 61/04; F16H 9/18; F16H 9/24; F16H 55/171; F16H 55/56; F16H 63/065
See application file for complete search history.

(56) References Cited

U.S. PATENT DOCUMENTS 2,161,913 A * 6/1939 Doyle ........................ F16H 7/06
474/163
4,515,576 A * 5/1985 Wiens ........................ F16H 9/24
474/149

(Continued)

FOREIGN PATENT DOCUMENTS

EP   1 972 831 A2   9/2008
JP   2010-014269 A  1/2010
(Continued)

*Primary Examiner* — William E Dondero
*Assistant Examiner* — Robert T Reese
(74) *Attorney, Agent, or Firm* — Foley & Lardner LLP

(57) ABSTRACT

A continuously variable transmission with an annular band body including grooves meshable with movable teeth provided on a second pulley and a biasing unit configured to bias the movable teeth radially outwardly of a shaft portion is provided with a hydraulic control unit configured to reduce a hydraulic pressure in a second oil chamber when a speed ratio reaches a predetermined speed ratio at which the grooves are meshed with the movable teeth.

12 Claims, 20 Drawing Sheets

(51) Int. Cl.

| | | |
|---|---|---|
| *F16H 55/56* | (2006.01) | |
| *F16H 9/18* | (2006.01) | |
| *F16H 9/24* | (2006.01) | |
| *F16H 61/04* | (2006.01) | |
| *F16H 61/12* | (2010.01) | |
| *F16H 63/06* | (2006.01) | |

(56) References Cited

U.S. PATENT DOCUMENTS

| | | | |
|---|---|---|---|
| 6,575,856 B2* | 6/2003 | Anderson | F16H 55/38 |
| | | | 474/83 |
| 6,893,369 B2* | 5/2005 | Fuerle | F16H 9/24 |
| | | | 474/162 |
| 2004/0038763 A1* | 2/2004 | Serkh | F16H 55/54 |
| | | | 474/54 |
| 2010/0044179 A1* | 2/2010 | Nakamura | F16D 13/52 |
| | | | 192/58.2 |
| 2011/0053717 A1 | 3/2011 | Miura et al. | |
| 2016/0138687 A1* | 5/2016 | Tange | F16H 9/10 |
| | | | 474/53 |

FOREIGN PATENT DOCUMENTS

| | | |
|---|---|---|
| JP | 2013-241996 A | 12/2013 |
| JP | 2014-185716 A | 10/2014 |

\* cited by examiner

CONTINUOUSLY VARIABLE TRANSMISSION AND CONTROL METHOD THEREFOR

TECHNICAL FIELD

The present invention relates to a continuously variable transmission.

BACKGROUND ART

Conventionally, a continuously variable transmission in which movable teeth biased radially outwardly by a spring are provided on a shaft portion of a pulley, meshing grooves are provided on an endless chain link and the meshing grooves are meshed with the movable teeth when a speed ratio reaches, for example, a highest speed ratio is disclosed in JP2010-014269A.

SUMMARY OF INVENTION

In the above continuously variable transmission, when a part of the endless chain link comes into contact with the movable teeth, the movable teeth are pressed radially inwardly by the endless chain link, thereby generating a radially outward biasing force by the spring. If it is attempted to change the speed ratio further to the highest speed ratio side, this biasing force has to be resisted. This causes a problem that it becomes difficult to change speed.

The present invention was developed to solve such a problem and aims to enable a smooth speed change after meshing grooves of an endless chain link come into contact with movable teeth.

A continuously variable transmission according to an aspect of the present invention is a continuously variable transmission, comprising: a first pulley including a first fixed conical plate and a first movable conical plate configured to move in an axial direction according to a hydraulic pressure supplied to and discharged from a first oil chamber; a second pulley including a second fixed conical plate, a second movable conical plate configured to move in an axial direction according to a hydraulic pressure supplied to and discharged from a second oil chamber and movable teeth movable in a radial direction of a shaft portion; an annular band body mounted between the first and second pulleys, configured to transmit power between the first and second pulleys and formed with grooves meshable with the movable teeth on an inner peripheral surface; a biasing unit configured to bias the movable teeth radially outwardly of the shaft portion; an oil pump driven by a power source and configured to supply the hydraulic pressure to the first and second oil chambers; and a hydraulic control unit configured to reduce a hydraulic pressure in the second oil chamber when a speed ratio reaches a predetermined speed ratio at which the grooves are meshed with the movable teeth.

A control method according to another aspect of the present invention is a method for controlling a continuously variable transmission with: a first pulley including a first fixed conical plate and a first movable conical plate configured to move in an axial direction according to a hydraulic pressure supplied to and discharged from a first oil chamber; a second pulley including a second fixed conical plate, a second movable conical plate configured to move in an axial direction according to a hydraulic pressure supplied to and discharged from a second oil chamber and movable teeth movable in a radial direction of a shaft portion; an annular band body mounted between the first and second pulleys, configured to transmit power between the first and second pulleys and formed with grooves meshable with the movable teeth on an inner peripheral surface; a biasing unit configured to bias the movable teeth radially outwardly of the shaft portion; and an oil pump driven by a power source and configured to supply the hydraulic pressure to the first and second oil chambers; wherein a hydraulic pressure in the second oil chamber is reduced when a speed ratio reaches a predetermined speed ratio at which the grooves are meshed with the movable teeth.

According to these aspects, a radially outward force that the annular band body receives from the secondary pulley becomes small by decreasing the hydraulic pressure in the second oil chamber when the speed ratio reaches the predetermined speed ratio at which the grooves are meshed with the movable teeth. Therefore, a change of the speed ratio to the highest speed ratio side becomes further easy by as much as an decrease of the radially outward force that the annular band body receives the secondary pulley even when the annular band body contacts with the movable teeth, the movable teeth are pressed radially inwardly by the annular band body and a biasing force is generated by the biasing unit in the case of changing the speed ratio, for example, to the highest speed ratio side. Thereby, it is possibly to suppress the speed change from being difficult when the speed ratio is further changed to the highest speed ratio side after the annular band body contacts with the movable teeth.

DESCRIPTION OF EMBODIMENT

Figure 1:
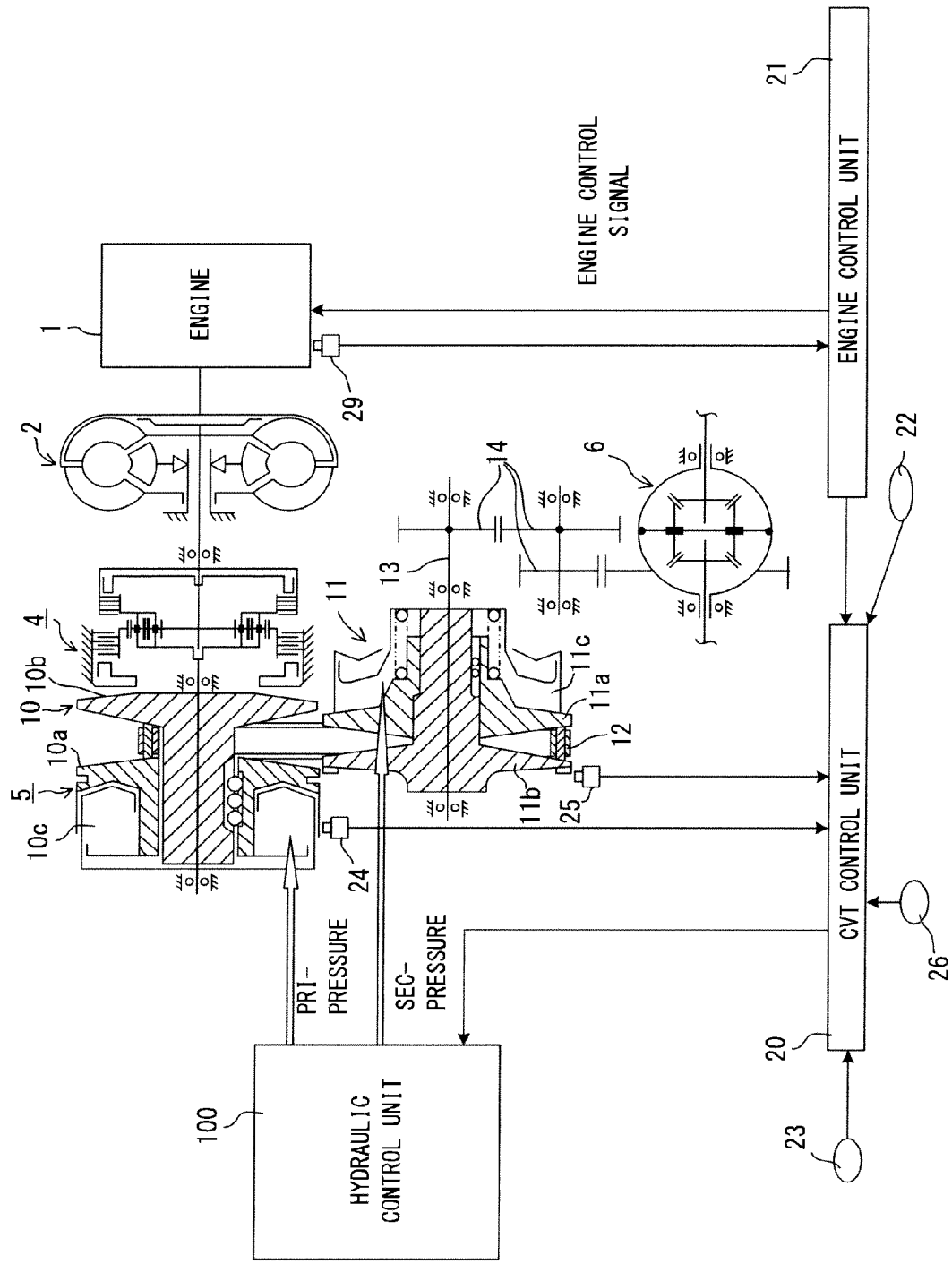
FIG. 1 is a schematic configuration diagram of a continuously variable transmission of a first embodiment.

Hereinafter, embodiments of the present invention are described on the basis of the accompanying drawings. It should be noted that, in the following description, a "speed ratio" is a value obtained by dividing an input rotation speed of a chain-type continuously variable transmission (hereinafter, referred to as a continuously variable transmission) by an output rotation speed thereof. A higher side in a continuously variable transmission is reached with a decrease in a speed ratio. FIG. 1 is a schematic configuration diagram of a continuously variable transmission in a first embodiment.

A continuously variable transmission 5 is coupled to an engine 1 via a torque converter 2 provided with a lock-up clutch and a forward/reverse switching mechanism 4. The continuously variable transmission 5 includes a primary pulley 10 to which a drive force is transmitted from the engine 1, a secondary pulley 11 which is coupled to an output shaft 13 and an endless chain link (hereinafter, referred to as a chain) 12 which is mounted on the primary pulley 10 and the secondary pulley 11. The output shaft 13 is coupled to a differential 6 via an idler gear 14.

Figure 4:
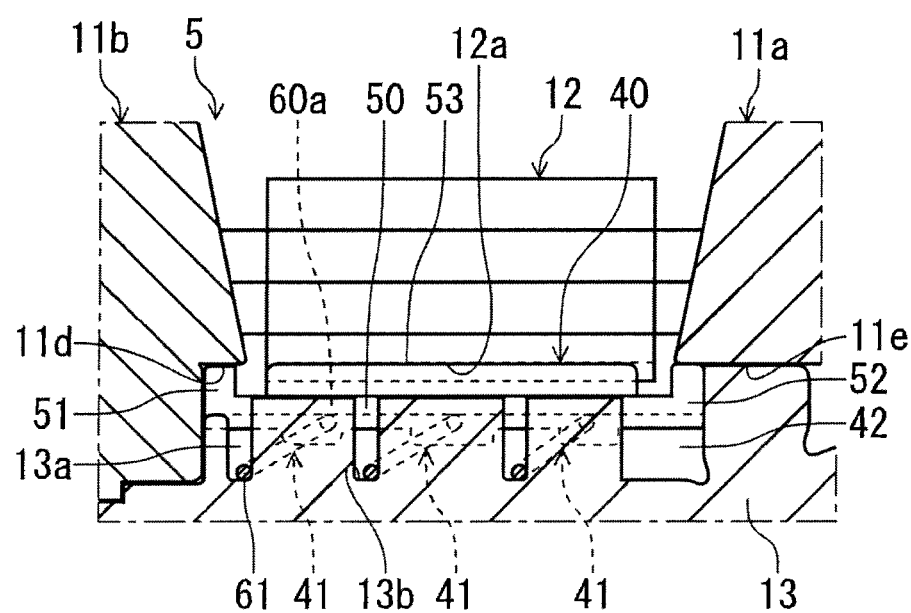
FIG. 4 is a schematic sectional view of the secondary pulley cut along an axial direction of an output shaft.

The chain 12 is a band body annularly formed by coupling a multitude of links by link pins. As shown in FIG. 4, meshing grooves 12a meshable with tooth portions 53 of movable teeth 40 to be described later are formed on the inner peripheral surface of the chain 12. Mesh means a state where the meshing grooves 12a and the tooth portions 53 overlap in a radial direction of the output shaft 13 and power is transmitted between the meshing grooves 12a and the tooth portions 53. By the mesh of the meshing grooves 12a with the movable teeth 40, the occurrence of a slip between the chain 12 and the secondary pulley 11 can be suppressed.

The primary pulley 10 includes a fixed conical plate 10b which integrally rotates with an input shaft and a movable conical plate 10a which is arranged to face the fixed conical plate 10b to form a V-shaped pulley groove. The movable conical plate 10a is displaced in an axial direction of the input shaft by supplying and discharging a primary pulley pressure to and from a primary pulley cylinder chamber 10c.

Figure 2:
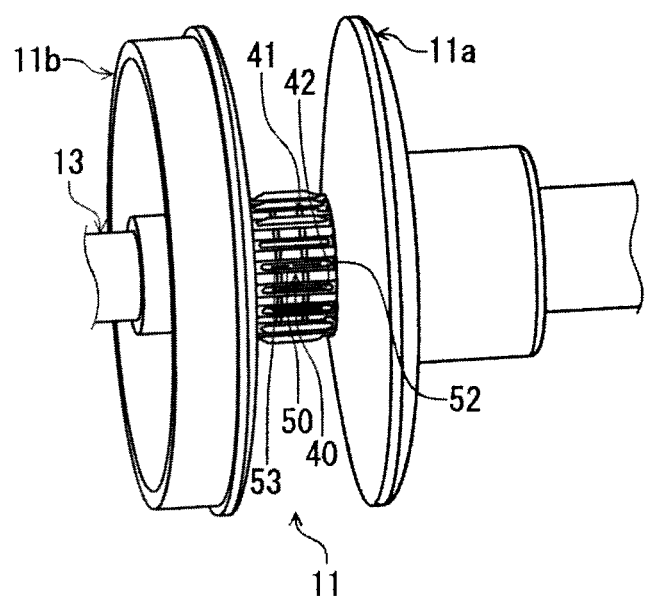
FIG. 2 is a schematic diagram of a secondary pulley with a chain removed.
Figure 3:
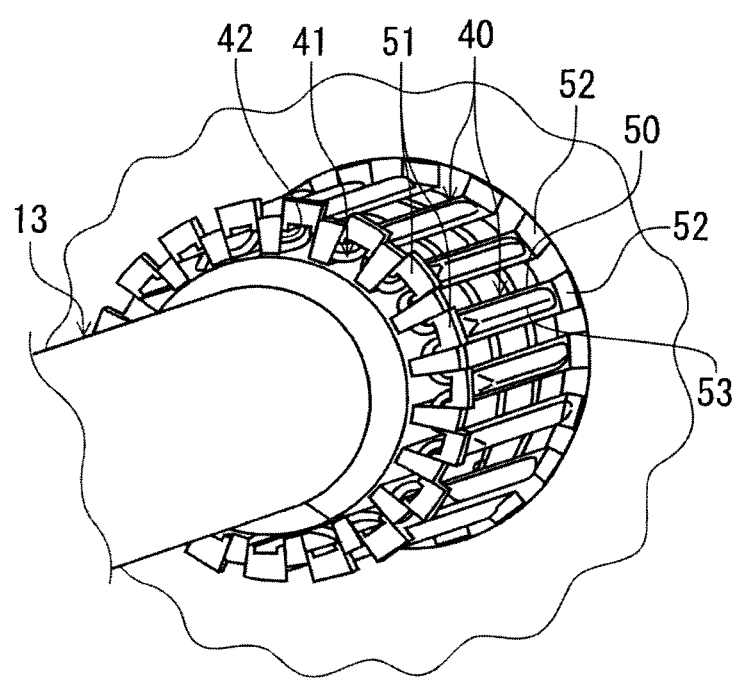
FIG. 3 is a schematic perspective view of an output shaft part of the secondary pulley.

The secondary pulley 11 includes a fixed conical plate 11b which integrally rotates with the output shaft, a movable conical plate 11a which is arranged to face the fixed conical plate 11b to form a V-shaped pulley groove, the movable teeth 40 which are formed along an axial direction of the output shaft 13 and springs 41 which bias the movable teeth 40 radially outwardly of the output shaft 13. The secondary pulley 11 is described in detail using FIGS. 2 to 4. FIG. 2 is a schematic diagram of the secondary pulley 11 with the chain 12 removed. FIG. 3 is a schematic perspective view of a part of the output shaft 13 of the secondary pulley 11. FIG. 4 is a schematic sectional view of the secondary pulley 11 cut along the axial direction of the output shaft 13.

The movable tooth 40 is provided movably in the radial direction of the output shaft 13 in each of a plurality of movable tooth guide grooves 42 provided at equal intervals in a circumferential direction and extending along the axial direction on the outer peripheral surface of the output shaft 13. The movable teeth 40 integrally rotate with the output shaft 13.

The movable tooth 40 includes a base portion 50 extending in the axial direction of the output shaft 13, a first stopper 51 projecting radially outwardly of the output shaft 13 from an end part of the base portion 50 on the side of the fixed conical plate 11b, a second stopper 52 projecting radially outwardly of the output shaft 13 from an end part of the base portion 50 on the side of the movable conical plate 11a and the tooth portion 53 projecting radially outwardly of the output shaft 13 from the base portion 50 between the first and second stoppers 51, 52.

The movable tooth 40 is pressed radially outwardly of the output shaft 13 by the springs 41 provided between the base portion 50 and the output shaft 13. The movable tooth 40 moves in the radial direction of the output shaft 13 according to an elastic force by the springs 41 and a pressing force generated when the meshing groove 12a of the chain 12 is meshed with the movable tooth 40. When the pressing force is absent or when the elastic force is larger than the pressing force, the first stopper 51 comes into contact with an inner peripheral surface 11d of the fixed conical plate 11b and the second stopper 52 comes into contact with an inner peripheral surface 11e of the fixed conical plate 11a. In this way, the first stopper 51 comes into contact with the inner peripheral surface 1d of the fixed conical plate 11b and the second stopper 52 comes into contact with the inner peripheral surface 11e of the fixed conical plate 11a, whereby an outward movement of the movable tooth 40 in the radial direction of the output shaft 13 is regulated. When the pressing force is larger than the elastic force, the movable tooth 40 moves toward the output shaft 13 and is held at a position where the pressing force and the elastic force are balanced.

Figure 5:
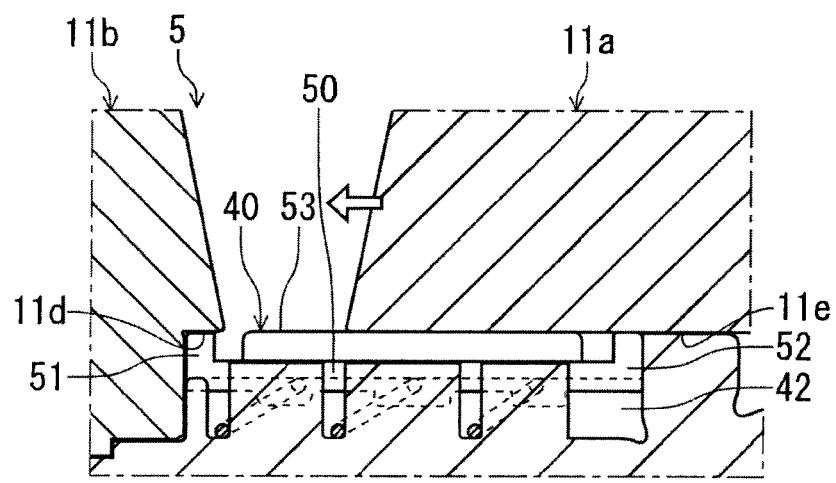
FIG. 5 is a view showing a state where a movable conical plate is moving toward a fixed conical plate in FIG. 4.

The tooth portion 53 is formed along the axial direction of the output shaft 13 and formed in conformity with the shape of the meshing groove 12a of the chain 12. The tip of the tooth portion 53 is formed not to project further radially outwardly of the output shaft 13 than the inner peripheral surfaces 11d, 11e. Thus, as shown in FIG. 5, the movable conical plate 11a is movable in the axial direction of the output shaft 13 without interfering with the tooth portions 53. FIG. 5 is a view showing a state where the movable conical plate 11a is moving toward the fixed conical plate 11b in FIG. 4.

Figure 6:
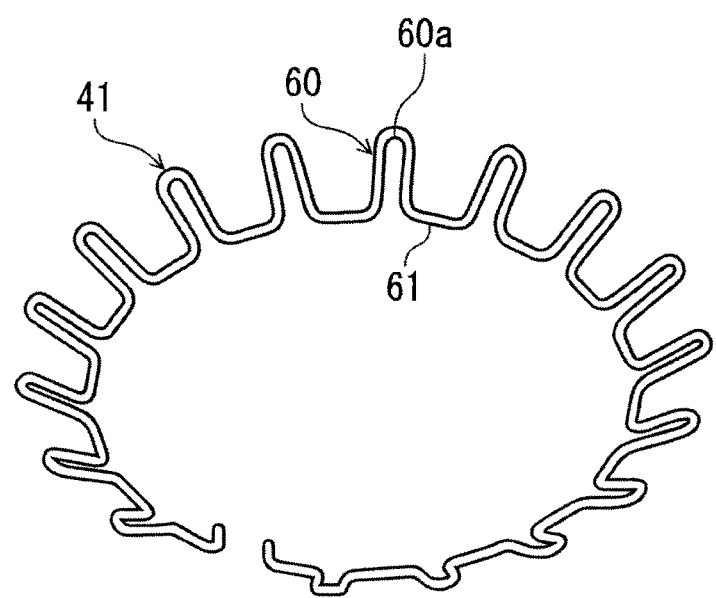
FIG. 6 is a schematic configuration diagram of a spring.

As shown in FIG. 6, the spring 41 is configured by alternately arranging linear U-shaped elements 60 and linear coupling elements 61 on the same circumference. FIG. 6 is a schematic configuration diagram of the spring 41. In the present embodiment, three springs 41 are arranged side by side in the axial direction of the output shaft 13 as shown in FIG. 4.

The coupling element 61 is engaged with a groove 13a provided in the circumferential direction of the output shaft 13 to regulate an inward movement of the coupling element 61 in the radial direction of the output shaft 13 by a groove bottom 13b.

The U-shaped element 60 is so provided that a bottom portion 60a of the U shape is located radially outwardly of the output shaft 13 with respect to the coupling elements 61, and the bottom portion 60a comes into contact with the movable tooth 40. The elastic force of the spring 41 increases as the movable tooth 40 is pressed radially inwardly of the output shaft 13. As many U-shaped elements 60 as the movable teeth 40 are provided and the elastic force received by each movable tooth 40 from the U-shaped elements 60 differs according to a contact state of each movable tooth 40 and the chain 12.

The movable conical plate 11a is displaced in the axial direction of the output shaft 13 by supplying and discharging the secondary pulley pressure to and from a secondary pulley cylinder chamber 11c.

The continuously variable transmission 5 changes speed by changing a balance between the primary pulley pressure and the secondary pulley pressure.

A speed ratio of the continuously variable transmission 5 and thrusts of the pulleys 10, 11 are controlled by a hydraulic control unit 100 which operates in response to a command from a CVT control unit 20. The CVT control unit 20 determines and controls a target speed ratio and thrusts on the basis of engine output torque information output from an engine control unit 21 for controlling the engine 1 and signals output from sensors and the like to be described later.

A drive torque generated in the engine 1 is input to the primary pulley 10 of the continuously variable transmission 5 via the torque converter 2 and the forward/reverse switching mechanism 4 and transmitted from the primary pulley 10 to the secondary pulley 11 via the chain 12. By displacing the movable conical plate 10a of the primary pulley 10 and the movable conical plate 11a of the secondary pulley 11 to change a contact radius of the primary pulley 10 and the chain 12 and that of the secondary pulley 11 and the chain 12, a speed ratio in the primary pulley 10 and the secondary pulley 11 is continuously changed.

Figure 7:
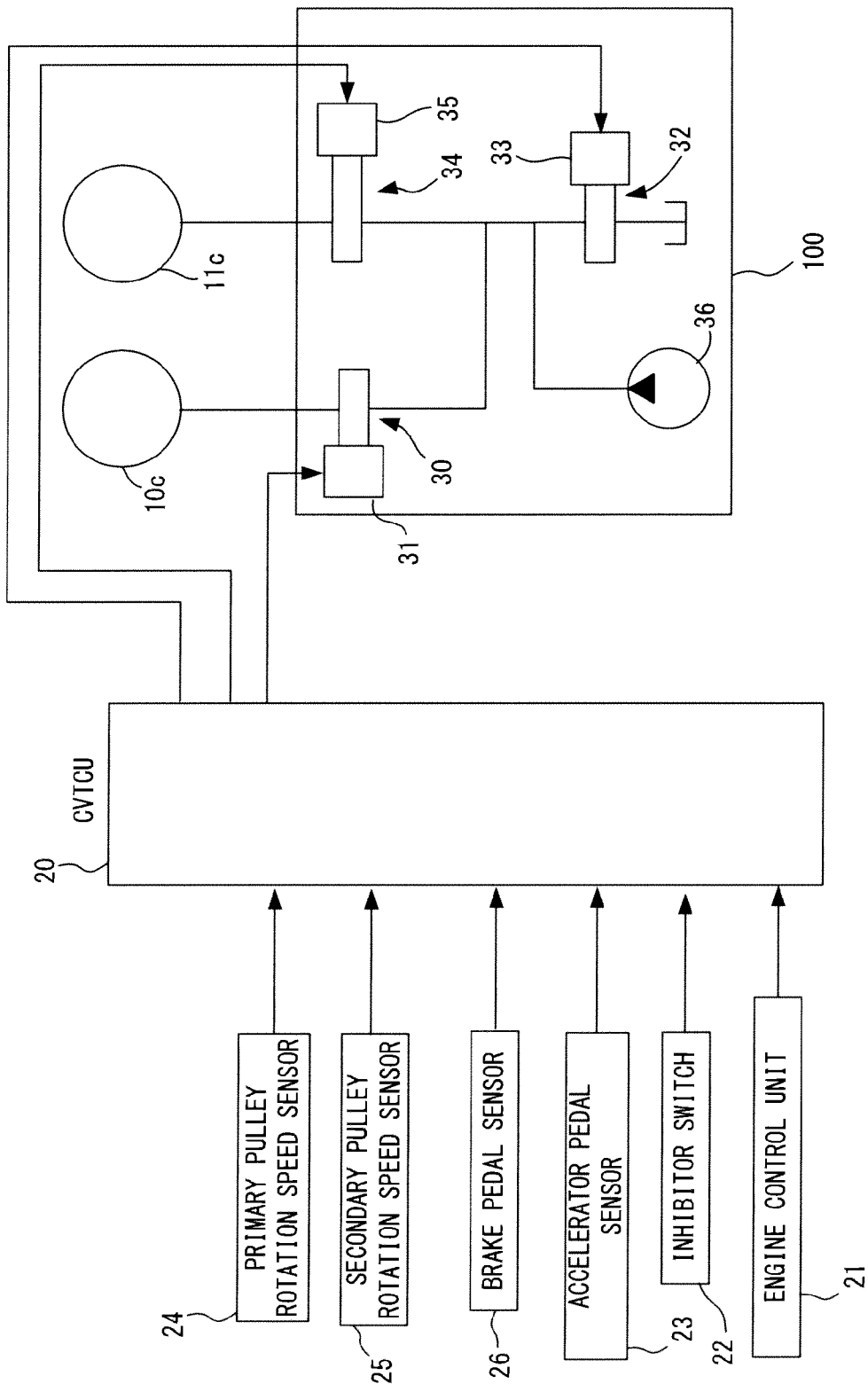
FIG. 7 is a conceptual diagram of a hydraulic control unit and a CVT control unit of the first embodiment.

As shown in FIG. 7, the hydraulic control unit 100 includes a regulator valve 32 for controlling a line pressure, a pressure reducing valve 30 for controlling the primary pulley pressure and a pressure reducing valve 34 for controlling the secondary pulley pressure. FIG. 7 is a conceptual diagram of the hydraulic control unit 100 and the CVT control unit 20 in the first embodiment.

The regulator valve 32 includes a solenoid 33 for adjusting a pressure of oil discharged from an oil pump 36 driven by the transmission of a part of the drive torque generated in the engine 1. The regulator valve 32 adjusts the pressure of the oil discharged from the oil pump 36 to a predetermined line pressure corresponding to an operating state in response to a command (e.g. duty signal or the like) from the CVT control unit 20.

The pressure reducing valve 30 includes a solenoid 31 for adjusting the line pressure. The pressure reducing valve 30 adjusts the line pressure to a predetermined primary pulley pressure in response to a command (e.g. duty signal or the like) from the CVT control unit 20. The primary pulley pressure is supplied to and discharged from the primary pulley cylinder chamber 10c.

The pressure reducing valve 34 includes a solenoid 35 for adjusting the line pressure. The pressure reducing valve 34 adjusts the line pressure to a predetermined secondary pulley pressure in response to a command (e.g. duty signal or the like) from the CVT control unit 20. The secondary pulley pressure is supplied to and discharged from the secondary pulley cylinder chamber 11c.

The CVT control unit 20 controls the speed ratio and the like on the basis of a signal from an inhibitor switch 22, a signal from an accelerator pedal 23, a signal from a primary pulley rotation speed sensor 24, a signal from a secondary pulley rotation speed sensor 25, a signal from a brake pedal sensor 26, a signal from the engine control unit 21 and the like. Information on an engine rotation speed and an output torque of the engine 1 is sent from the engine control unit 21 on the basis of a signal from an engine rotation speed sensor 29.

In the case of changing the speed ratio to a high side, e.g. to a highest speed ratio in the continuously variable transmission 5, some of the meshing grooves 12a of the chain 12 start being meshed with the movable teeth 40 before the speed ratio reaches the highest speed ratio and some of the movable teeth 40 are pressed radially inwardly of the output shaft 13 by the chain 12. It should be noted that even if some of the meshing grooves 12a of the chain 12 are meshed with the movable teeth 40, the other meshing grooves 12a of the chain 12 are not meshed with the movable teeth 40 and the chain 12 is pressing the movable teeth 40 radially inwardly of the output shaft 13. Thus, after the speed ratio reaches a speed ratio at which the meshing grooves 12a of the chain 12 start being meshed with the movable teeth 40, an elastic force by the springs 41 acts on the chain 12 and the speed has to be changed in consideration of the elastic force by the springs 41.

A transmission control of the present embodiment facilitates a change to the speed ratio at which the meshing grooves 12a of the chain 12 are meshed with the movable teeth 40 by adjusting the secondary pulley pressure in the above situation.

Figure 8:
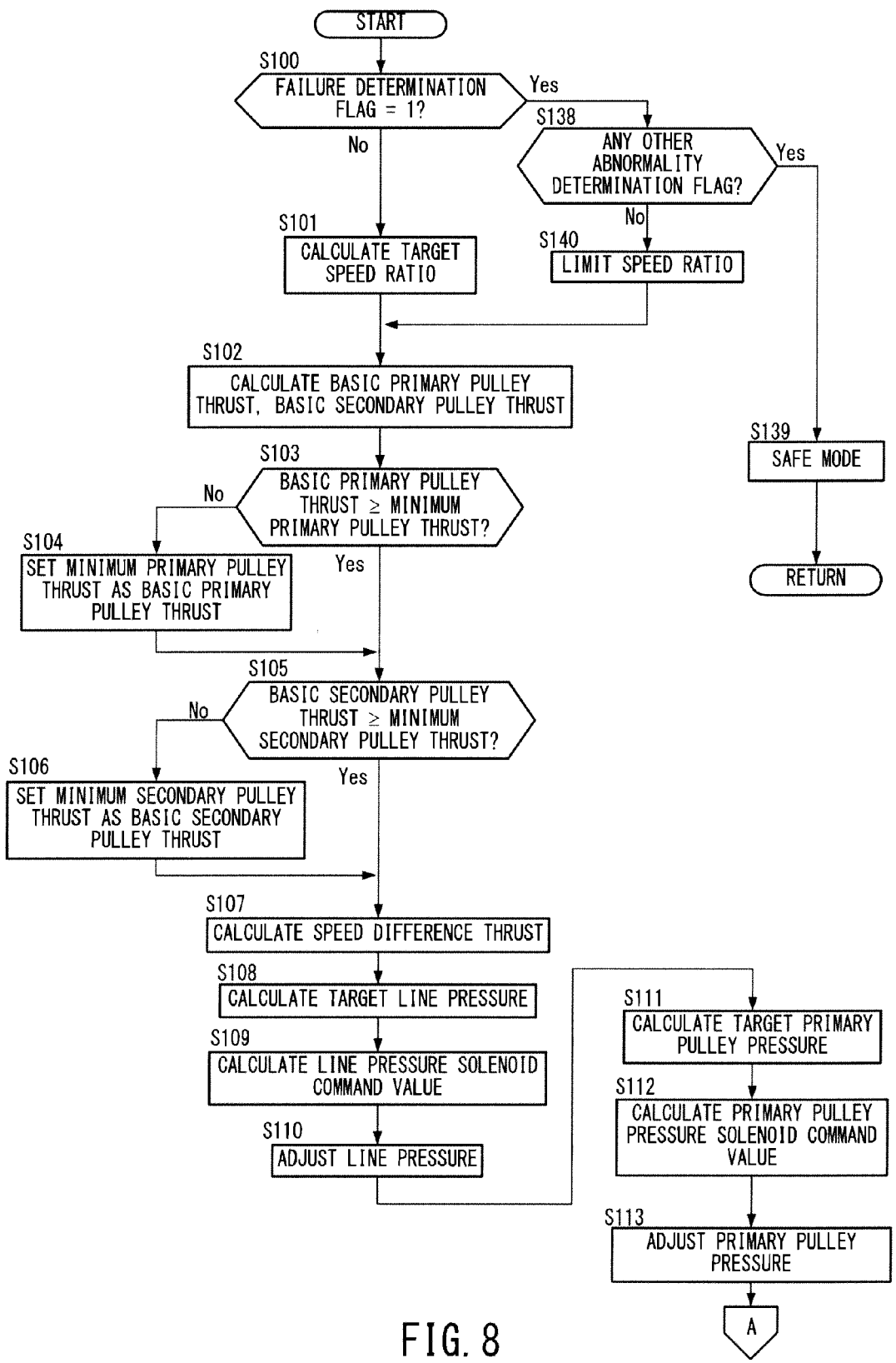
FIG. 8 is a flow chart showing a transmission control of the first embodiment.
Figure 9:
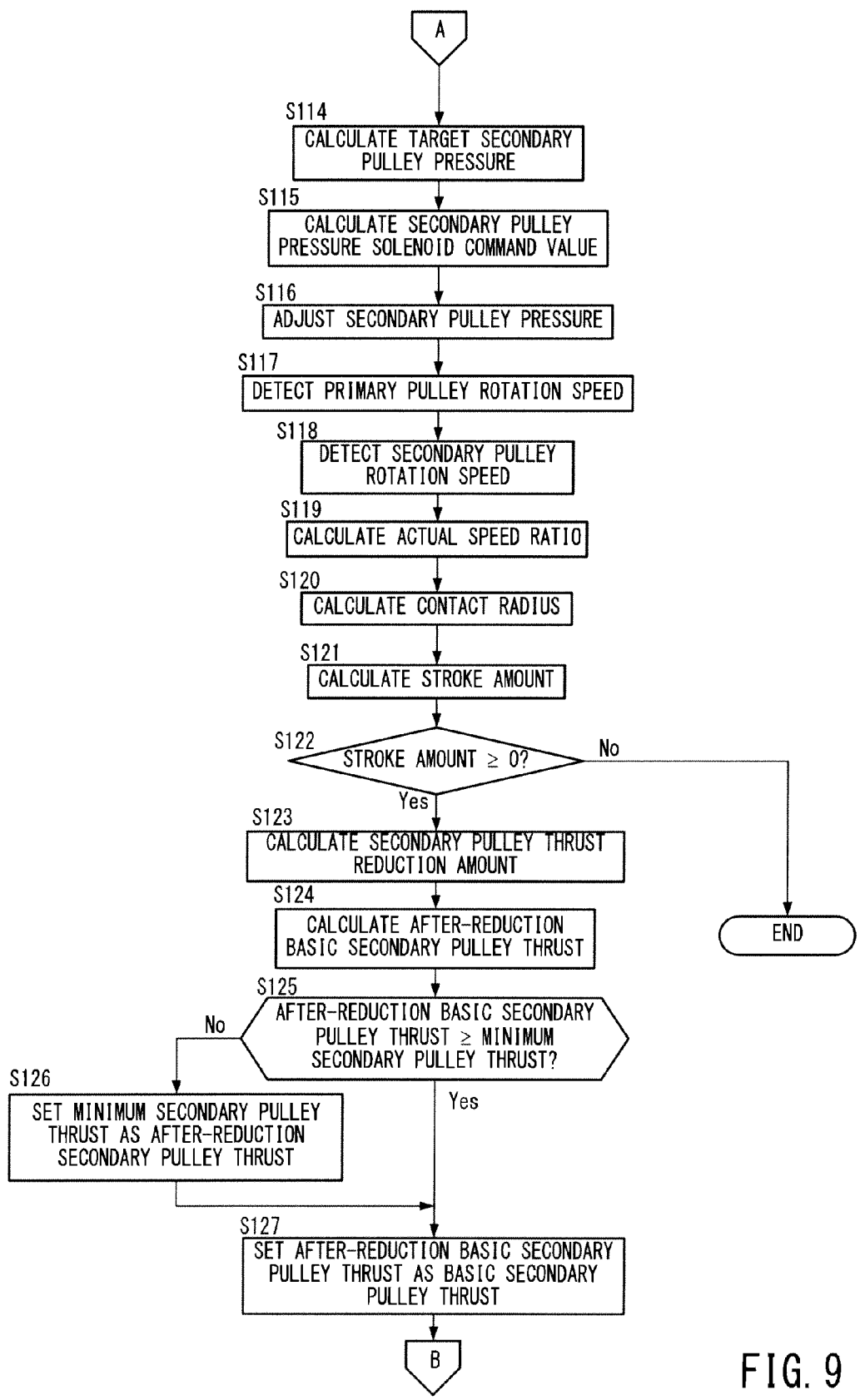
FIG. 9 is a flow chart showing the transmission control of the first embodiment.
Figure 10:
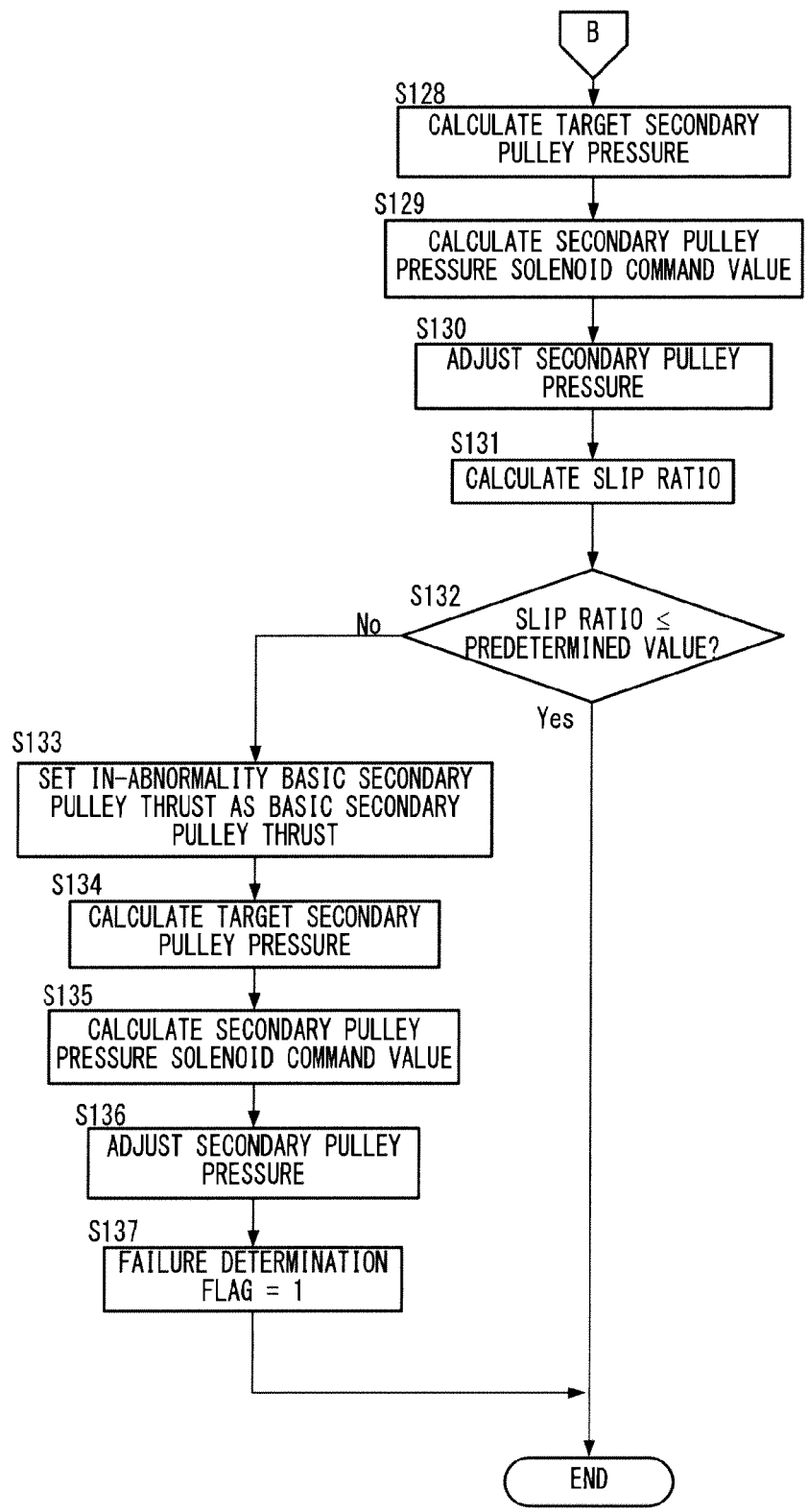
FIG. 10 is a flow chart showing the transmission control of the first embodiment.

Next, the transmission control in the present embodiment is described with reference to flow charts of FIGS. 8 to 10.

In Step S100, the CVT control unit 20 determines whether or not a failure determination flag to be described in detail later is "1". A process proceeds to Step S138 if the failure determination flag is "1" while proceeding to Step S101 if the failure determination flag is "0".

In Step S101, the CVT control unit 20 calculates a target speed ratio from a shift line map on the basis of an input torque, a throttle opening, a vehicle speed and the position of a select lever. The throttle opening is detected on the basis of a signal from the accelerator pedal sensor 23. The vehicle speed is detected on the basis of a signal from an unillustrated wheel speed sensor. The position of the select lever is detected on the basis of a signal from the inhibitor switch 22.

In Step S102, the CVT control unit 20 calculates a basic primary pulley thrust and a basic secondary pulley thrust on the basis of the target speed ratio. The basic primary pulley thrust and the basic secondary pulley thrust are thrusts obtained by adding a safety margin to minimum thrust limit values minimum necessary to realize the target speed ratio.

In Step S103, the CVT control unit 20 determines whether or not the basic primary pulley thrust is not smaller than a minimum primary pulley thrust. The process proceeds to Step S105 if the basic primary pulley thrust is not smaller than the minimum primary pulley thrust while proceeding to Step S104 if the basic primary pulley thrust is smaller than the minimum primary pulley thrust.

In Step S104, the CVT control unit 20 sets the minimum primary pulley thrust as the basic primary pulley thrust.

In Step S105, the CVT control unit 20 determines whether or not the basic secondary pulley thrust is not smaller than a minimum secondary pulley thrust. The process proceeds to Step S107 if the basic secondary pulley thrust is not smaller than the minimum secondary pulley thrust while proceeding to Step S106 if the basic secondary pulley thrust is smaller than the minimum secondary pulley thrust.

In Step S106, the CVT control unit 20 sets the minimum secondary pulley thrust as the basic secondary pulley thrust.

In Step S107, the CVT control unit 20 calculates a speed difference thrust on the basis of the basic primary pulley thrust and the basic secondary pulley thrust.

Figure 11:
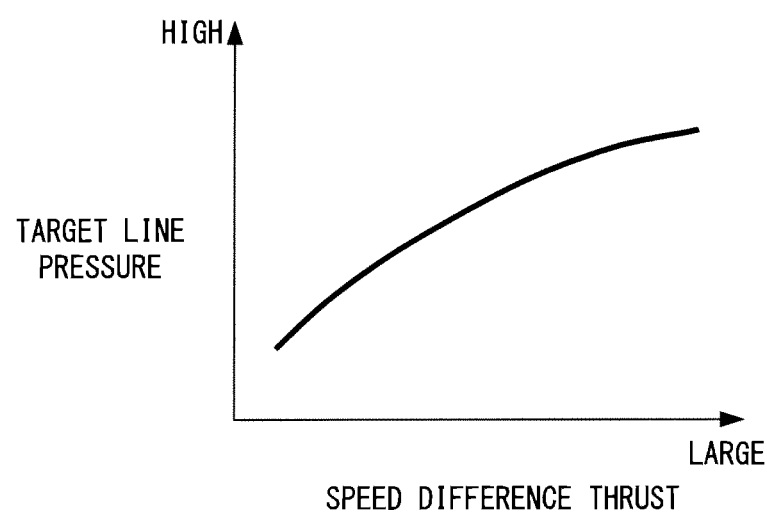
FIG. 11 is a map showing a relationship between a speed difference thrust and a target line pressure.

In Step S108, the CVT control unit 20 calculates a target line pressure from a speed difference thrust map shown in FIG. 11 on the basis of the speed difference thrust.

Figure 12:
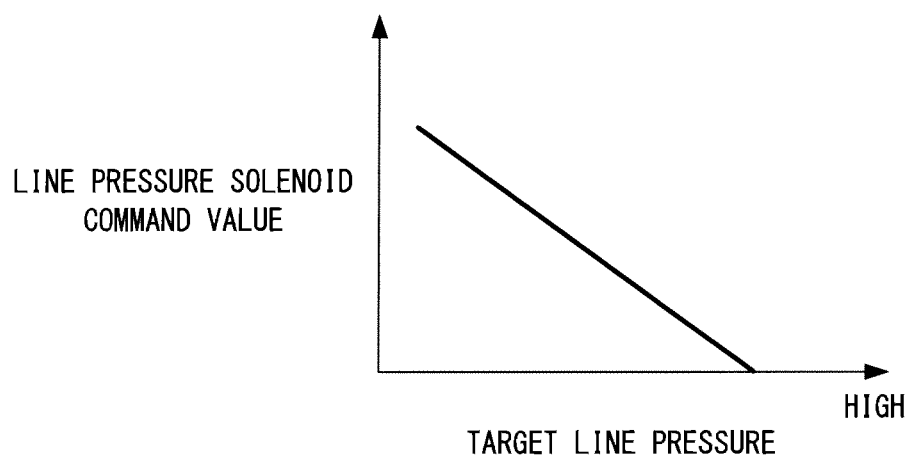
FIG. 12 is a map showing a relationship between the target line pressure and a line pressure solenoid command value.

In Step S109, the CVT control unit 20 calculates a line pressure solenoid command value from a map shown in FIG. 12 on the basis of the target line pressure.

In Step S110, the CVT control unit 20 adjusts the line pressure by controlling the solenoid 33 of the regulator valve 32 on the basis of the line pressure solenoid command value.

In Step S111, the CVT control unit 20 calculates a target primary pulley pressure on the basis of the basic primary pulley thrust.

Figure 13:
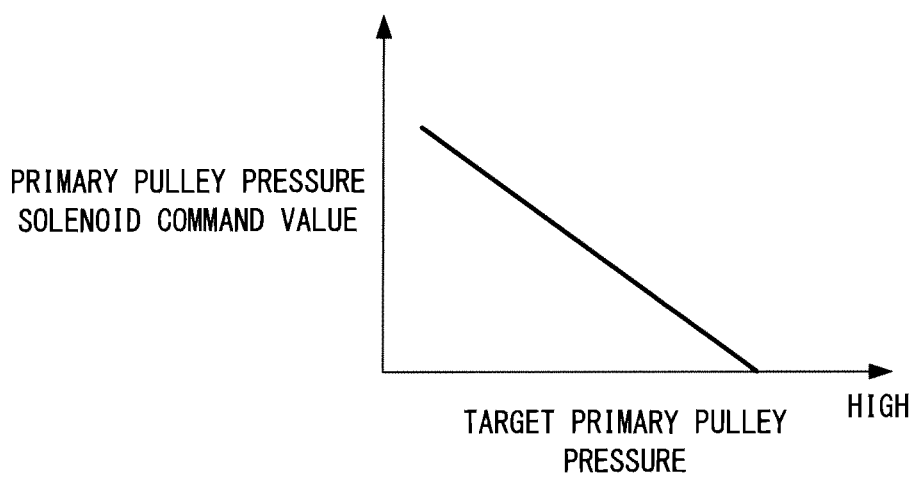
FIG. 13 is a map showing a relationship between a target primary pulley pressure and a primary pulley pressure solenoid command value.

In Step S112, the CVT control unit 20 calculates a primary pulley pressure solenoid command value from a map shown in FIG. 13 on the basis of the target primary pulley pressure.

In Step S113, the CVT control unit 20 adjusts the primary pulley pressure by controlling the solenoid 31 of the pressure reducing valve 30 on the basis of the primary pulley pressure solenoid command value.

In Step S114, the CVT control unit 20 calculates a target secondary pulley pressure on the basis of the basic secondary pulley thrust.

Figure 14:
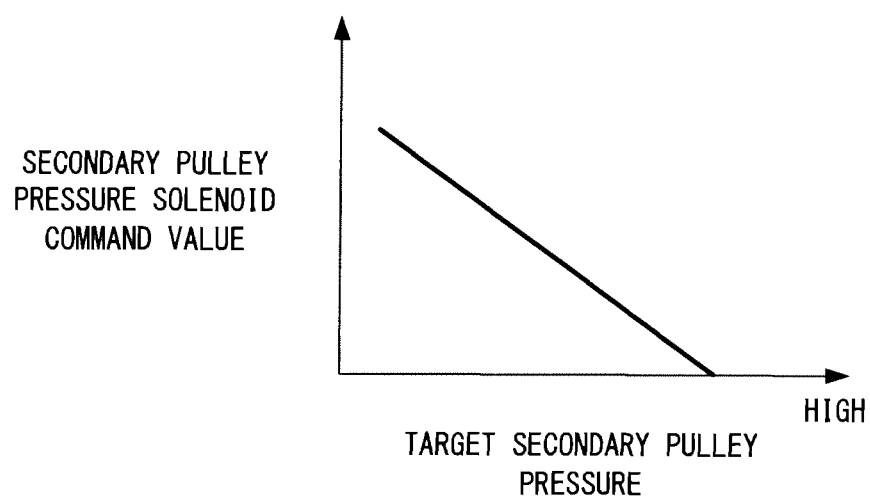
FIG. 14 is a map showing a relationship between a target secondary pulley pressure and a secondary pulley pressure solenoid command value.

In Step S115, the CVT control unit 20 calculates a secondary pulley pressure solenoid command value from a map shown in FIG. 14 on the basis of the target secondary pulley pressure.

In Step S116, the CVT control unit 20 adjusts the secondary pulley pressure by controlling the solenoid 35 of the pressure reducing valve 34 on the basis of the secondary pulley pressure solenoid command value.

In Step S117, the CVT control unit 20 detects a primary pulley rotation speed on the basis of a signal from the primary pulley rotation speed sensor 24.

In Step S118, the CVT control unit 20 detects a secondary pulley rotation speed on the basis of a signal from the secondary pulley rotation speed sensor 25.

In Step S119, the CVT control unit 20 calculates an actual speed ratio by dividing the primary pulley rotation speed by the secondary pulley rotation speed.

In Step S120, the CVT control unit 20 calculates a contact radius of the secondary pulley 11 and the chain 12 on the basis of the actual speed ratio and the secondary pulley rotation speed.

In Step S121, the CVT control unit 20 calculates a stroke amount of the movable teeth 40. Specifically, the CVT control unit 20 calculates a deviation between a predetermined radius, which is the contact radius of the secondary pulley 11 and the chain 12 when the speed ratio at which the meshing grooves 12a of the chain 12 are meshed with the movable teeth 40 (predetermined speed ratio) is reached, and the contact radius of the secondary pulley 11 and the chain 12 calculated in Step S120. The stroke amount is not smaller than zero when the meshing grooves 12a of the chain 12 and the movable teeth 40 are meshed while being smaller than zero when the meshing grooves 12a of the chain 12 and the movable teeth 40 are not meshed.

In Step S122, the CVT control unit 20 determines whether or not the stroke amount is not smaller than zero. This control is finished when the stroke amount is smaller than zero, whereas the process proceeds to Step S123 if the stroke amount is not smaller than zero. If the stroke amount is not smaller than zero, the elastic force of the springs 41 acts on the chain 12 on the side of the secondary pulley 11 in addition to a holding force by a hydraulic pressure supplied to the secondary pulley cylinder chamber 11c. The elastic force by the springs 41 serves as a force hindering a speed change to a high side. The elastic force by the springs 41 increases with an increase in the stroke amount.

Figure 15:
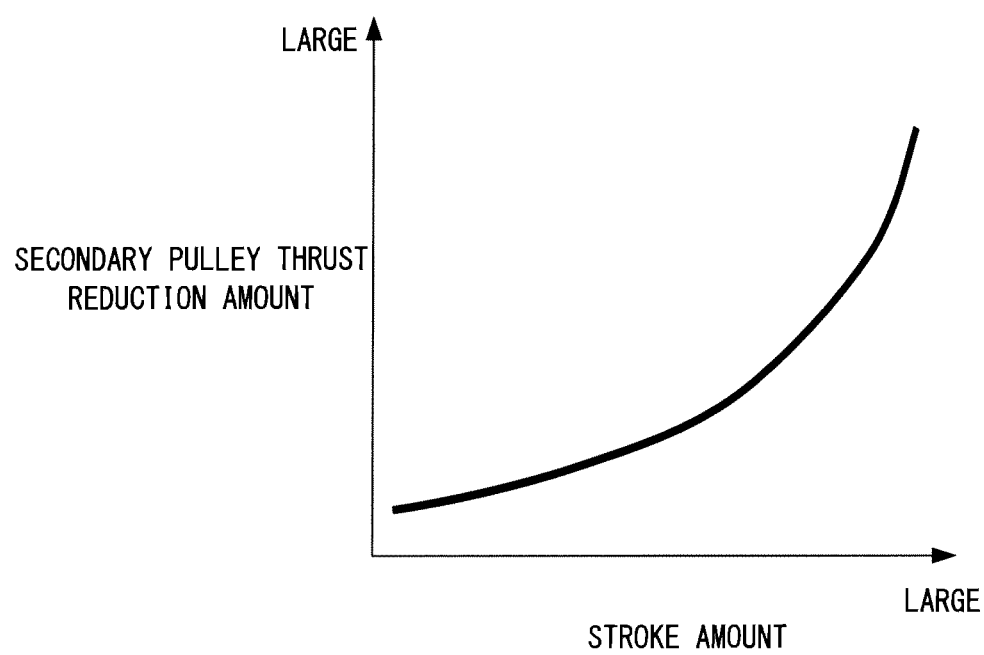
FIG. 15 is a map showing a relationship between a stroke amount and a secondary pulley thrust reduction amount.

In Step S123, the CVT control unit 20 calculates a secondary pulley thrust reduction amount from a map shown in FIG. 15 on the basis of the stroke amount. The secondary pulley thrust reduction amount increases with an increase in the stroke amount and is calculated to reduce a tensile force of the chain 12 increased on the side of the secondary pulley 11 by the elastic force by the springs 41. This enables a speed change to be performed without increasing the primary pulley pressure and smoothly performed even if the meshing grooves 12a of the chain 12 are meshed with the movable teeth 40.

In Step S124, the CVT control unit 20 calculates an after-reduction basic secondary pulley thrust by subtracting the secondary pulley thrust reduction amount from the basic secondary pulley thrust.

In Step S125, the CVT control unit 20 determines whether or not the after-reduction basic secondary pulley thrust is not smaller than the minimum secondary pulley thrust. The process proceeds to Step S127 if the after-reduction basic secondary pulley thrust is not smaller than the minimum secondary pulley thrust while proceeding to S126 if the after-reduction basic secondary pulley thrust is smaller than the minimum secondary pulley thrust.

In Step S126, the CVT control unit 20 sets the minimum secondary pulley thrust as the after-reduction basic secondary pulley thrust.

In Step S127, the CVT control unit 20 sets the after-reduction basic secondary pulley thrust as the basic secondary pulley thrust. Here, the current basic secondary pulley thrust is overwritten with the after-reduction basic secondary pulley thrust.

In Step S128, the CVT control unit 20 calculates the target secondary pulley pressure on the basis of the basic secondary pulley thrust set in Step S127.

In Step S129, the CVT control unit 20 calculates the secondary pulley pressure solenoid command value from the map shown in FIG. 14 on the basis of the target secondary pulley pressure.

In Step S130, the CVT control unit 20 adjusts the secondary pulley pressure by controlling the solenoid 35 of the pressure reducing valve 34 on the basis of the secondary pulley pressure solenoid command value. If the basic secondary pulley thrust is overwritten in Step S127, the secondary pulley pressure is adjusted again according to the value thereof.

In Step S131, the CVT control unit 20 calculates a slip ratio on the basis of the actual speed ratio and the target speed ratio. The slip ratio is a deviation between the actual speed ratio and the target speed ratio. If a slip occurs in the secondary pulley 11, the rotation speed of the primary pulley 10 becomes higher with respect to the rotation speed of the secondary pulley 11. Thus, the actual speed ratio increases with respect to the target speed ratio.

In Step S132, the CVT control unit 20 determines whether or not the slip ratio is not larger than a predetermined value. The predetermined value is a value for determining whether or not the meshing grooves 12a of the chain 12 and the movable teeth 40 are meshed, and set in advance by an experiment or the like. For example, if the slip ratio is larger than the predetermined value although the stroke amount is determined to be not smaller than zero and the meshing grooves 12a of the chain 12 and the movable teeth 40 are determined to be meshed in Step S122, an abnormality might have occurred in at least one of the movable teeth 40, the springs 41 and the chain 12 and the meshing grooves 12a of the chain 12 and the movable teeth 40 may not be meshed.

In Step S132, the CVT control unit 20 determines that an abnormality has occurred in at least one of the movable teeth 40, the springs 41 and the chain 12 if the slip ratio is larger than the predetermined value. This control is finished if the slip ratio is not larger than the predetermined value, whereas the process proceeds to Step S133 if the slip ratio is larger than the predetermined value.

In Step S133, the CVT control unit 20 sets an in-abnormality basic secondary pulley thrust applied when an abnormality occurs in at least one of the movable teeth 40, the springs 41 and the chain 12 and the meshing grooves 12*a* of the chain 12 and the movable teeth 40 are not meshed as the basic secondary pulley thrust. Here, the basic secondary pulley thrust set in Step S127 is further overwritten.

In Step S134, the CVT control unit 20 calculates the target secondary pulley pressure on the basis of the basic secondary pulley thrust.

In Step S135, the CVT control unit 20 calculates the secondary pulley pressure solenoid command value from the map shown in FIG. 14 on the basis of the target secondary pulley pressure.

In Step S136, the CVT control unit 20 adjusts the secondary pulley pressure by controlling the solenoid 35 of the pressure reducing valve 34 on the basis of the secondary pulley pressure solenoid command value. Here, if the basic secondary pulley thrust is overwritten in Step S133, the secondary pulley pressure is adjusted again according to the value thereof.

In Step S137, the CVT control unit 20 sets the failure determination flat to "1". It should be noted that the failure determination flag is set at "0" as an initial value.

If the failure determination flag is determined to be "1" in Step S100, the CVT control unit 20 determines whether or not any abnormality has occurred in the continuously variable transmission 5 on the basis of another abnormality determination flag such as a flag indicating the occurrence of a slip at a speed ratio lower than the speed ratio at which the meshing grooves 12*a* of the chain 12 and the movable teeth 40 are meshed in Step S138. The process proceeds to Step S139 if another abnormality has occurred in the continuously variable transmission 5 while proceeding to Step S140 if no other abnormality has occurred in the continuously variable transmission 5.

In Step S139, the CVT control unit 20 performs a safe mode. In the safe mode, the speed ratio is maintained at the current speed ratio, for example, when the vehicle is traveling, and is limited to the lowest speed ratio after the vehicle stops.

In Step S140, the CVT control unit 20 limits the speed ratio so that the meshing grooves 12*a* of the chain 12 and the movable teeth 40 are not meshed. Further, the CVT control unit 20 turns on a warning lamp indicating the occurrence of an abnormality in at least one of the movable teeth 40, the springs 41 and the chain 12, thereby notifying it to the driver.

Effects of the first embodiment of the present invention are described.

In the case of changing the speed ratio to the one at which the meshing grooves 12*a* of the chain 12 are meshed with the movable teeth 40, the secondary pulley pressure is reduced when the actual speed ratio reaches the speed ratio at which the meshing grooves 12*a* of the chain 12 are meshed with the movable teeth 40. In this way, speed can be smoothly changed in the case of changing the speed ratio, for example, to the highest one. Further, if it is attempted to change the speed ratio to the high side against the force of the movable teeth 40 for pushing back the chain 12 to have a lower speed ratio without reducing the secondary pulley pressure, the primary pulley pressure has to be increased to obtain a further differential thrust. However, since the secondary pulley pressure is reduced, an increase of the primary pulley pressure can be suppressed, the primary pulley pressure can also be low after the speed ratio is changed to the highest speed ratio and the fuel economy of the engine 1 for operating the oil pump 36 can be improved. Further, the oil pump 36 can be miniaturized by as much as an increase of the primary pulley pressure is suppressed and the fuel economy of the engine 1 can be improved also by this. That is, if an increase of the primary pulley pressure cannot be suppressed, an actually necessary hydraulic pressure is increased by that much and the oil pump 36 is enlarged according to that. However, if the oil pump 36 is enlarged, energy for driving the oil pump 36 also increases by a corresponding amount, thereby leading to the degradation of the fuel economy.

As the stroke amount increases and the elastic force by the springs 41 increases, the secondary pulley thrust reduction amount is increased. In this way, the secondary pulley pressure can be reduced according to the elastic force of the springs 41 and the secondary pulley pressure can be reduced while a shortage in the holding force for the secondary pulley 11 is suppressed. Thus, speed can be smoothly changed by suppressing the occurrence of a slip between the chain 12 and the secondary pulley 11 and, further, the fuel economy of the engine 1 for operating the oil pump 36 can be improved.

When the actual speed ratio reaches the speed ratio at which the meshing grooves 12*a* of the chain 12 are meshed with the movable teeth 40 and the stroke amount becomes not smaller than zero, the secondary pulley pressure is reduced. In this way, speed can be smoothly changed by reducing the secondary pulley pressure at the same time as the meshing grooves 12*a* of the chain 12 are meshed with the movable teeth 40 and, further, the fuel economy of the engine 1 for operating the oil pump 36 can be improved.

If the after-reduction basic secondary pulley thrust is lower than the minimum secondary pulley thrust even when the meshing grooves 12*a* of the chain 12 are meshed with the movable teeth 40, it is prevented that the secondary pulley thrust becomes lower than the minimum secondary pulley thrust. In this way, the occurrence of a slip between the chain 12 and the secondary pulley 11 can be suppressed. For example, if the holding force for the secondary pulley 11 decreases and a torque received by the movable teeth 40 becomes excessively large even when the meshing grooves 12*a* of the chain 12 are meshed with the movable teeth 40, the biasing force of the movable teeth 40 is overwhelmed, the movable teeth 40 recede radially inwardly and a slip may occur between the chain 12 and the secondary pulley 11. However, this can be suppressed.

If it is determined that the meshing grooves 12*a* of the chain 12 are not meshed with the movable teeth 40 after the actual speed ratio reaches the speed ratio at which the meshing grooves 12*a* of the chain 12 are meshed with the movable teeth 40, the occurrence of an abnormality in at least one of the movable teeth 40, the springs 41 and the chain 12 is determined. In this way, abnormality occurrence in the movable teeth 40, the springs 41 and the chain 12 can be detected.

If the slip ratio between the actual speed ratio and the target speed ratio becomes larger than the predetermined value and it is determined that the meshing grooves 12*a* of the chain 12 are not meshed with the movable teeth 40 after the actual speed ratio reaches the speed ratio at which the meshing grooves 12*a* of the chain 12 are meshed with the movable teeth 40 and the stroke amount becomes not smaller than zero, the occurrence of an abnormality in at least one of the movable teeth 40, the springs 41 and the chain 12 is determined. In this way, abnormality occurrence in the movable teeth 40, the springs 41 and the chain 12 can be detected without using a hydraulic pressure sensor.

If the occurrence of an abnormality in at least one of the movable teeth 40, the springs 41 and the chain 12 is determined, the speed ratio is limited to the one at which the meshing grooves 12a of the chain 12 and the movable teeth 40 are not meshed. In this way, it can be suppressed that the state of the movable teeth 40, the springs 41 or the chain 12 having experienced the abnormality is further degraded.

The warning light is turned on when the occurrence of an abnormality in at least one of the movable teeth 40, the springs 41 and the chain 12 is determined. In this way, the occurrence of the abnormality can be notified to the driver.

Next, a second embodiment of the present invention is described.

Figure 16:
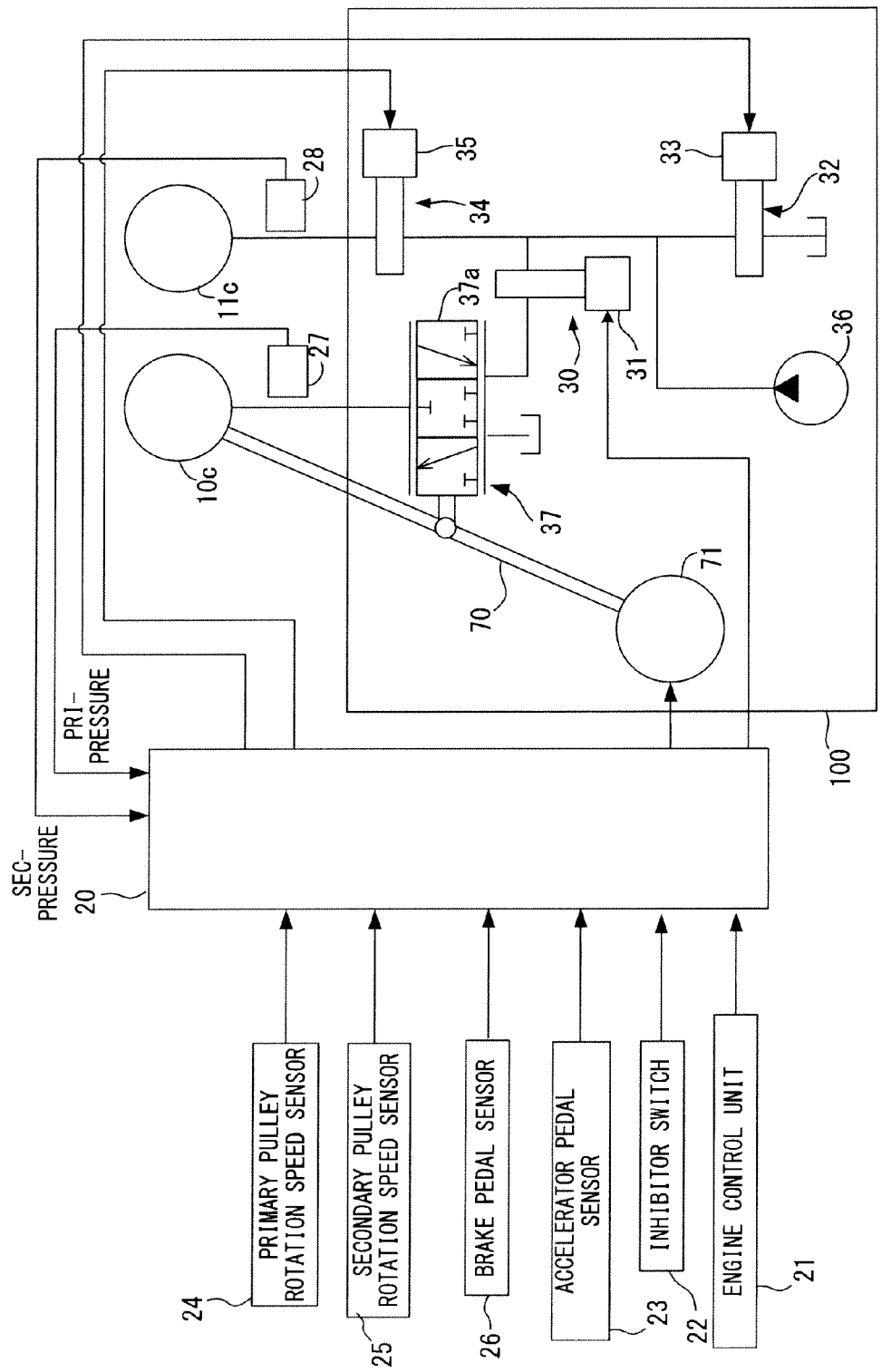
FIG. 16 is a conceptual diagram of a hydraulic control unit and a CVT control unit of a second embodiment.

The second embodiment differs from the first embodiment in a hydraulic control unit 100 and a CVT control unit 20. Here, the hydraulic control unit 100 and the CVT control unit 20 are mainly described using FIG. 16. FIG. 16 is a conceptual diagram of the hydraulic control unit 100 and the CVT control unit 20. The same components as those in the first embodiment are denoted by the same reference signs as in the first embodiment and not described here.

The hydraulic control unit 100 includes a regulator valve 32, a transmission control valve 37, a pressure reducing valve 30 and a pressure reducing valve 34.

The transmission control valve 37 is a control valve for controlling a primary pulley pressure in a primary pulley cylinder chamber 10c to a desired target pressure. The transmission control valve 37 is coupled to a servo link 70 constituting a mechanical feedback mechanism, is driven by a step motor 71 coupled to one end of the servo link 70 and receives a feedback on a groove width from a movable conical plate 10a of a primary pulley 10 coupled to the other end of the servo link 70, i.e. an actual speed ratio. The transmission control valve 37 adjusts a primary pulley pressure to achieve a target speed ratio commanded at a driving position of the step motor 71 by supplying and discharging a hydraulic pressure to and from the primary pulley cylinder chamber 10c by a displacement of a spool 37a and holds the spool 37a at a valve closing position in response to a displacement of the servo link 70 when a speed change is actually finished.

The CVT control unit 20 controls the speed ratio and the like on the basis of a signal from an inhibitor switch 22, a signal from an accelerator pedal 23, a signal from a primary pulley rotation speed sensor 24, a signal from a secondary pulley rotation speed sensor 25, a signal from a brake pedal sensor 26, a signal from a primary pulley pressure sensor 27, a signal from a secondary pulley sensor 28 and the like.

Figure 17:
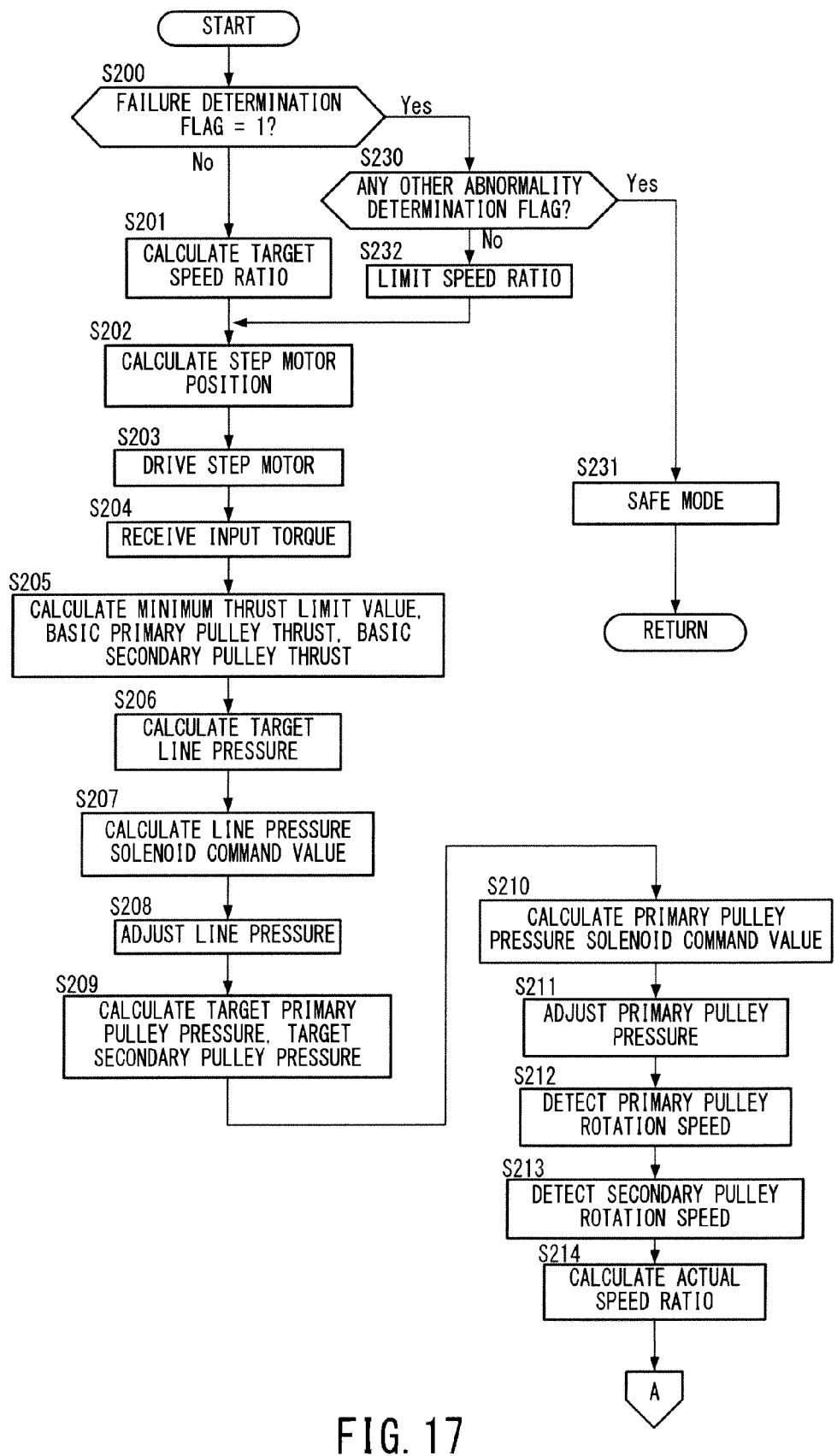
FIG. 17 is a flow chart showing a transmission control of the second embodiment.
Figure 18:
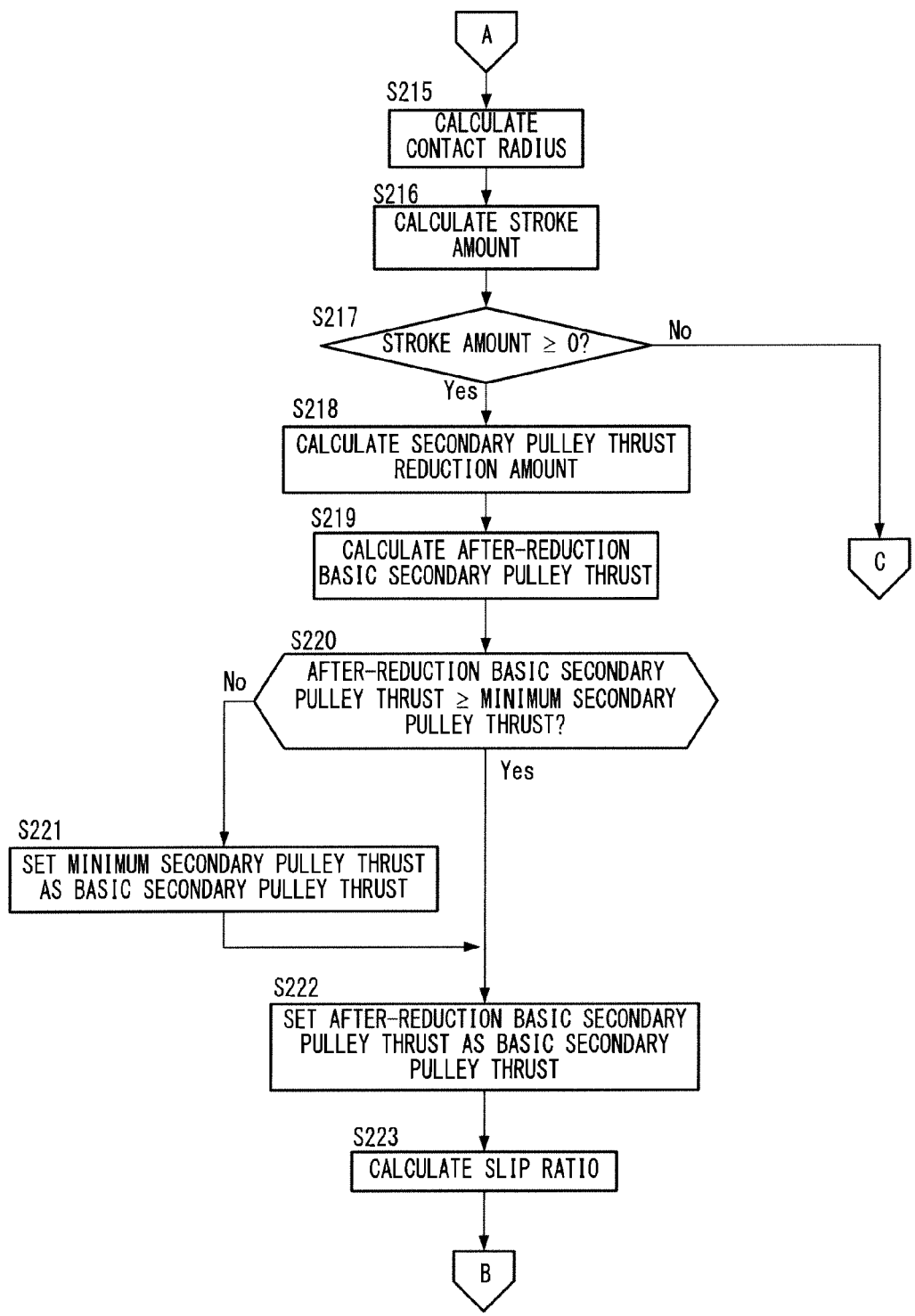
FIG. 18 is a flow chart showing the transmission control of the second embodiment.
Figure 19:
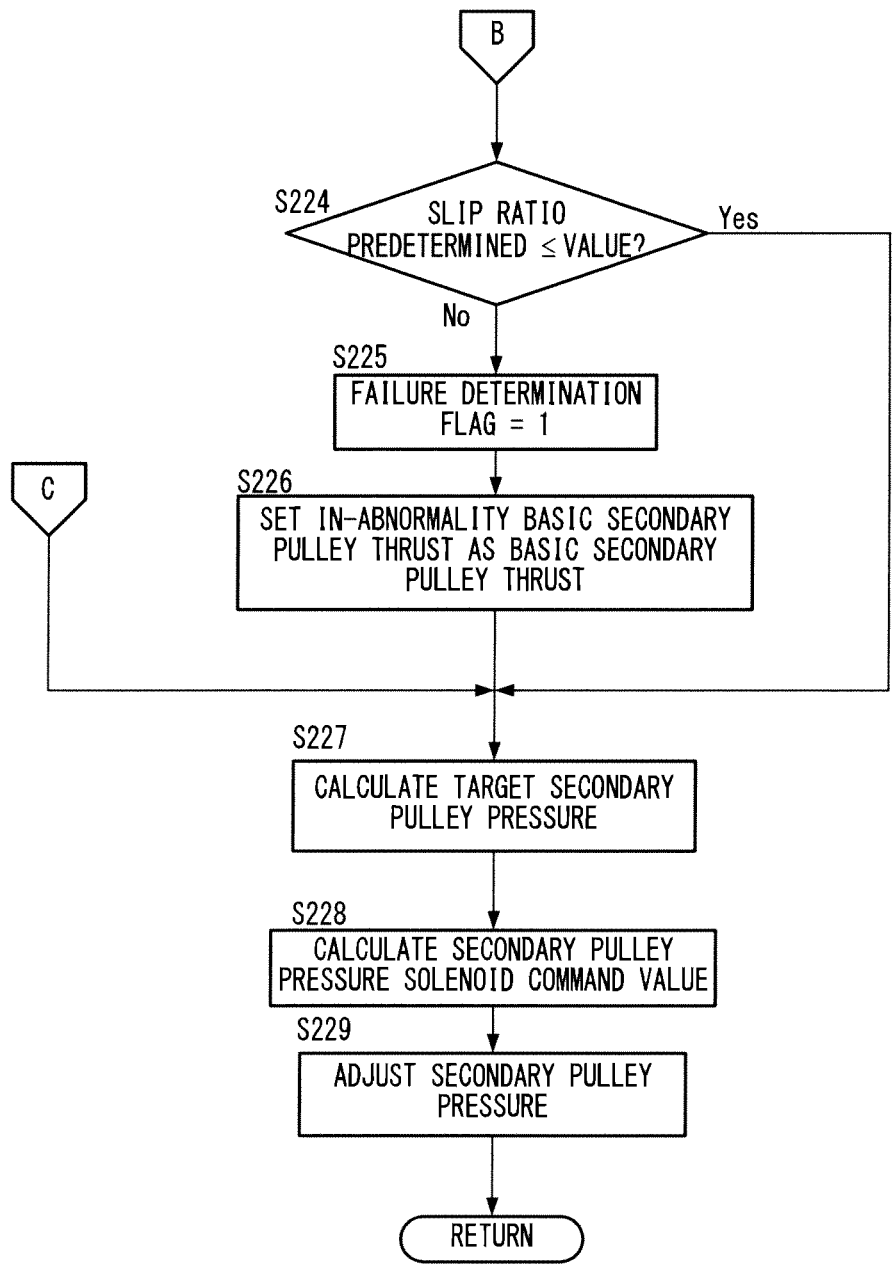
FIG. 19 is a flow chart showing the transmission control of the second embodiment.

Next, a transmission control in the present embodiment is described using flow charts of FIGS. 17 to 19.

In Step S200, the CVT control unit 20 determines whether or not a failure determination flag is "1". A process proceeds to Step S230 if the failure determination flag is "1" while proceeding to Step S201 if the failure determination flag is "0".

In Step S201, the CVT control unit 20 calculates a target speed ratio from a vehicle speed, an engine rotation speed, a throttle opening and the position of a select lever. The engine rotation speed is detected on the basis of a signal from an engine rotation speed sensor 29.

Figure 20:
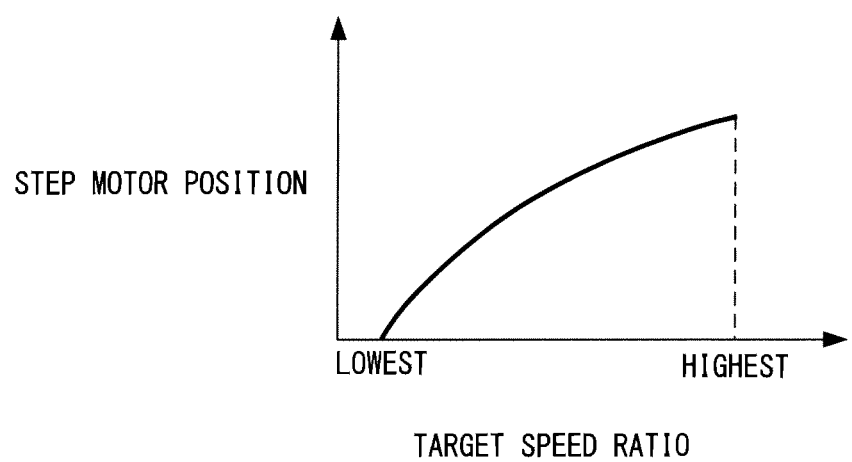
FIG. 20 is a map showing a relationship between a target speed ratio and a step motor position.

In Step S202, the CVT control unit 20 calculates a step motor position from a map shown in FIG. 20 on the basis of the target speed ratio.

In Step S203, the CVT control unit 20 drives the step motor 71 on the basis of the calculated step motor position. In this way, the transmission control valve 37 is controlled.

In Step S204, the CVT control unit 20 receives information on an input torque from an engine control unit 21.

In Step S205, the CVT control unit 20 calculates a minimum thrust limit value, a basic primary pulley thrust and a basic secondary pulley thrust on the basis of the target speed ratio and the input torque.

In Step S206, the CVT control unit 20 calculates a target line pressure on the basis of the basic primary pulley thrust and the basic secondary pulley thrust.

In Step S207, the CVT control unit 20 calculates a line pressure solenoid command value from the map shown in FIG. 12 on the basis of the target line pressure.

In Step S208, the CVT control unit 20 adjusts the line pressure by controlling a solenoid 33 of the regulator valve 32 on the basis of the line pressure solenoid command value.

In Step S209, the CVT control unit 20 calculates a target primary pulley pressure and a target secondary pulley pressure by a thrust distribution control on the basis of the basic secondary pulley thrust and the minimum thrust limit value.

In Step S210, the CVT control unit 20 calculates a primary pulley pressure solenoid command value from the map shown in FIG. 13 on the basis of the target primary pulley pressure.

In Step S211, the CVT control unit 20 adjusts the primary pulley pressure supplied to the transmission control valve 37 by controlling a solenoid 31 of the pressure reducing valve 30 on the basis of the primary pulley pressure solenoid command value.

In Step S212, the CVT control unit 20 detects a primary pulley rotation speed on the basis of a signal from the primary pulley rotation speed sensor 24.

In Step S213, the CVT control unit 20 detects a secondary pulley rotation speed on the basis of a signal from the secondary pulley rotation speed sensor 25.

In Step S214, the CVT control unit 20 calculates an actual speed ratio by dividing the primary pulley rotation speed by the secondary pulley rotation speed.

In Step S215, the CVT control unit 20 calculates a contact radius of the secondary pulley 11 and a chain 12 on the basis of the actual speed ratio and the secondary pulley rotation speed.

In Step S216, the CVT control unit 20 calculates a stroke amount of movable teeth 40. A calculation method for the stroke amount is the same method as in Step S121 of the first embodiment.

In Step S217, the CVT control unit 20 determines whether or not the stroke amount is not smaller than zero. The process proceeds to Step S227 if the stroke amount is smaller than zero while proceeding to Step S218 if the stroke amount is not smaller than zero.

In Step S218, the CVT control unit 20 calculates a secondary pulley thrust reduction amount from the map shown in FIG. 15 on the basis of the stroke amount.

In Step S219, the CVT control unit 20 calculates an after-reduction basic secondary pulley thrust by subtracting the secondary pulley thrust reduction amount from the basic secondary pulley thrust.

In Step S220, the CVT control unit 20 determines whether or not the after-reduction basic secondary pulley thrust is not smaller than the minimum secondary pulley thrust. The process proceeds to Step S222 if the after-reduction basic secondary pulley thrust is not smaller than the minimum secondary pulley thrust while proceeding to S221 if the after-reduction basic secondary pulley thrust is smaller than the minimum secondary pulley thrust.

In Step S221, the CVT control unit 20 sets the minimum secondary pulley thrust as the after-reduction basic secondary pulley thrust.

In Step S222, the CVT control unit 20 sets the after-reduction basic secondary pulley thrust as the basic secondary pulley thrust. Here, the basic secondary pulley thrust calculated in Step S205 is overwritten.

In Step S223, the CVT control unit 20 calculates a slip ratio on the basis of the actual speed ratio and the target speed ratio. A calculation method for the slip ratio is the same method as in Step S131 of the first embodiment.

In Step S224, the CVT control unit 20 determines whether or not the slip ratio is not larger than a predetermined value. The process proceeds to Step S227 if the slip ratio is not larger than the predetermined value while proceeding to Step S225 if the slip ratio is larger than the predetermined value.

In Step S225, the CVT control unit 20 sets the failure determination flat to "1".

In Step S226, the CVT control unit 20 sets an in-abnormality basic secondary pulley thrust applied when an abnormality occurs in at least one of the movable teeth 40, springs 41 and the chain 12 and meshing grooves 12a of the chain 12 and the movable teeth 40 are not meshed as the basic secondary pulley thrust. Here, the basic secondary pulley thrust set in Step S222 is further overwritten.

In Step S227, the CVT control unit 20 calculates the target secondary pulley pressure. Specifically, the CVT control unit 20 sets the target secondary pulley pressure calculated in Step S209 as it is as the target secondary pulley pressure if the stroke amount is smaller than zero in Step S217. The CVT control unit 20 calculates the target secondary pulley pressure on the basis of the basic secondary pulley thrust set in Step S222 if the slip ratio is determined to be not larger than the predetermined value in Step S224. Further, the CVT control unit 20 calculates the target secondary pulley pressure on the basis of the basic secondary pulley thrust set in Step S226 if the slip ratio is determined to be larger than the predetermined value in Step S224.

In Step S228, the CVT control unit 20 calculates a secondary pulley pressure solenoid command value from the map shown in FIG. 14 on the basis of the target secondary pulley pressure.

In Step S229, the CVT control unit 20 adjusts the secondary pulley pressure by controlling a solenoid 35 of the pressure reducing valve 34 on the basis of the secondary pulley pressure solenoid command value.

Since a control in Steps S230 to S232, which is a control after the failure determination flag is determined to be "1" in Step S200, is the same as a control in Steps S138 to S140 of the first embodiment, it is not described here.

Effects of the second embodiment of the present invention are described.

Also in the continuously variable transmission 5 including the step motor 71 and the transmission control valve 37, effects similar to those of the first embodiment can be obtained.

Although the embodiments of the present invention have been described above, the above embodiments are merely some application examples of the present invention and not of the nature to limit the technical scope of the present invention to the specific configurations of the above embodiments.

Although whether or not the meshing grooves 12a of the chain 12 and the movable teeth 40 are meshed is determined on the basis of the stroke amount in the above embodiments, it may be determined based on the position of the movable conical plate 11a of the secondary pulley 11, sound generated when the chain 12 and the movable teeth 40 come into contact, vibration or the like.

Although the secondary pulley thrust reduction amount is calculated and the secondary pulley pressure is reduced if the stroke amount becomes not smaller than zero in the above embodiments, the secondary pulley thrust reduction amount may be calculated and the secondary pulley pressure may be reduced if the stroke amount is not smaller than a predetermined value (positive value) instead of zero.

Although it is determined on the basis of the slip ratio that an abnormality has occurred in at least one of the movable teeth 40, the springs 41 and the chain 12 and the meshing grooves 12a of the chain 12 and the movable teeth 40 are not meshed in the above embodiments, it may be determined on the basis of the hydraulic pressure, oil vibration, sound or the like. For example, in the case of determination on the basis of the hydraulic pressure, the primary pulley pressure is detected by the primary pulley pressure sensor 27 and it is determined that the meshing grooves 12a of the chain 12 and the movable teeth 40 are meshed if the detected hydraulic pressure is lower than a predetermined hydraulic pressure at which the meshing grooves 12a of the chain 12 and the movable teeth 40 are meshed. By detecting the primary pulley pressure, abnormality occurrence can be accurately detected if an abnormality has occurred in at least one of the movable teeth 40, the springs 41 and the chain 12.

Although the engine 1 is used as a drive source in the above embodiments, a motor or an engine and a motor may be used as the drive source.

Although the chain 12 is used as a power transmitting portion (band body) of the continuously variable transmission 5 in the above embodiments, a power transmitting portion for transmitting power on a pulling side such as a rubber belt meshable with the movable teeth 40 may be used.

Although being provided on the secondary pulley 11 in the above embodiments, the movable teeth 40 may be provided on the primary pulley 10.

Although the speed ratio is limited in the above embodiments if an abnormality has occurred in at least one of the movable teeth 40, the springs 41 and the chain 12, a reduction of the secondary pulley pressure may be prevented when the meshing grooves 12a of the chain 12 and the movable teeth 40 are meshed. This can suppress the occurrence of a slip between the chain 12 and the secondary pulley 11.

The present application claims for priority based on Japanese Patent Application No. 2013-61776 filed with Japan Patent Office on Mar. 25, 2013, and the entire contents of this application are incorporated in this Description by reference.

The invention claimed is:

1. A continuously variable transmission, comprising:
a first pulley including a first fixed conical plate and a first movable conical plate configured to move in an axial direction according to a hydraulic pressure supplied to and discharged from a first oil chamber;
a second pulley including a second fixed conical plate, a second movable conical plate configured to move in an axial direction according to a hydraulic pressure supplied to and discharged from a second oil chamber and movable teeth movable in a radial direction of a shaft portion;

an annular band body mounted between the first and second pulleys, configured to transmit power between the first and second pulleys and formed with grooves meshable with the movable teeth on an inner peripheral surface;

a biasing unit configured to bias the movable teeth radially outwardly of the shaft portion;

an oil pump driven by a power source and configured to supply the hydraulic pressure to the first and second oil chambers; and a hydraulic control unit configured to reduce a hydraulic pressure in the second oil chamber when a speed ratio reaches a predetermined speed ratio at which the grooves are meshed with the movable teeth.

2. The continuously variable transmission according to claim 1, wherein:

the hydraulic control unit is configured to increase a reduction amount of the hydraulic pressure in the second oil chamber as a biasing force by the biasing unit increases.

3. The continuously variable transmission according to claim 1, wherein:

the hydraulic control unit is configured to reduce the hydraulic pressure in the second oil chamber at the same time as the grooves are meshed with the movable teeth.

4. The continuously variable transmission according to claim 1, wherein:

the hydraulic control unit is configure to prevent the hydraulic pressure in the second oil chamber from being reduced lower than a lower limit hydraulic pressure.

5. The continuously variable transmission according to claim 1, comprising:

a mesh determination unit configured to determine whether or not the grooves are meshed with the movable teeth; and an abnormality determination unit configured to determine the occurrence of an abnormality in at least one of the movable teeth, the biasing unit and the band body if it is determined by the mesh determination unit that the grooves are not meshed with the movable teeth after the speed ratio reaches a predetermined speed ratio at which the band body receives a biasing force by the biasing unit from the movable teeth.

6. The continuously variable transmission according to claim 5, comprising:

a target speed ratio calculation unit configured to calculate a target speed ratio;

a speed ratio calculation unit configured to calculate an actual speed ratio; and a deviation calculation unit configured to calculate a deviation between the actual speed ratio and the target speed ratio, wherein the mesh determination unit is configured to determine that the grooves are not meshed with the movable teeth if the deviation is larger than a predetermined value.

7. The continuously variable transmission according to claim 5, comprising:

a hydraulic pressure detection unit configured to detect a hydraulic pressure in the first oil chamber;

wherein the mesh determination unit is configured to determine that the grooves are not meshed with the movable teeth if the hydraulic pressure in the first oil chamber is lower than a predetermined hydraulic pressure at which the grooves and the movable teeth are meshed even when the speed ratio reaches a predetermined speed ratio at which the grooves and the movable teeth are meshed.

8. The continuously variable transmission according to claim 5, comprising:

a limitation unit configured to limit the speed ratio to the one at which the grooves are not meshed with the movable teeth if the occurrence of an abnormality in at least one of the movable teeth, the biasing unit and the band body is determined by the abnormality determination unit.

9. The continuously variable transmission according to claim 5, wherein:

the hydraulic control unit is configured to prevent a reduction of the hydraulic pressure in the second oil chamber if the occurrence of an abnormality in at least one of the movable teeth, the biasing unit and the band body is determined by the abnormality determination unit.

10. The continuously variable transmission according to claim 5, comprising:

a notification unit configured to notify abnormality occurrence if the occurrence of an abnormality in at least one of the movable teeth, the biasing unit and the band body is determined by the abnormality determination unit.

11. A continuously variable transmission, comprising:

a first pulley including a first fixed conical plate and a first movable conical plate configured to move in an axial direction according to a hydraulic pressure supplied to and discharged from a first oil chamber;

a second pulley including a second fixed conical plate, a second movable conical plate configured to move in an axial direction according to a hydraulic pressure supplied to and discharged from a second oil chamber and movable teeth movable in a radial direction of a shaft portion;

an annular band body mounted between the first and second pulleys, configured to transmit power between the first and second pulleys and formed with grooves meshable with the movable teeth on an inner peripheral surface;

biasing means for biasing the movable teeth radially outwardly of the shaft portion;

oil pump for supplying the hydraulic pressure to the first and second oil chambers, the oil pump being driven by a power source; and hydraulic control means for reducing a hydraulic pressure in the second oil chamber when a speed ratio reaches a predetermined speed ratio at which the grooves are meshed with the movable teeth.

12. A control method for controlling a continuously variable transmission with:

a first pulley including a first fixed conical plate and a first movable conical plate configured to move in an axial direction according to a hydraulic pressure supplied to and discharged from a first oil chamber;

a second pulley including a second fixed conical plate, a second movable conical plate configured to move in an axial direction according to a hydraulic pressure supplied to and discharged from a second oil chamber and movable teeth movable in a radial direction of a shaft portion;

an annular band body mounted between the first and second pulleys, configured to transmit power between the first and second pulleys and formed with grooves meshable with the movable teeth on an inner peripheral surface;

a biasing unit configured to bias the movable teeth radially outwardly of the shaft portion; and an oil pump driven by a power source and configured to supply the hydraulic pressure to the first and second oil chambers;

the control method comprising:

reducing a hydraulic pressure in the second oil chamber when a speed ratio reaches a predetermined speed ratio at which the grooves are meshed with the movable teeth.

* * * * *